Feb. 10, 1942. E. A. JOHNSTON 2,272,300
FUEL PUMP
Filed March 6, 1939 3 Sheets—Sheet 2

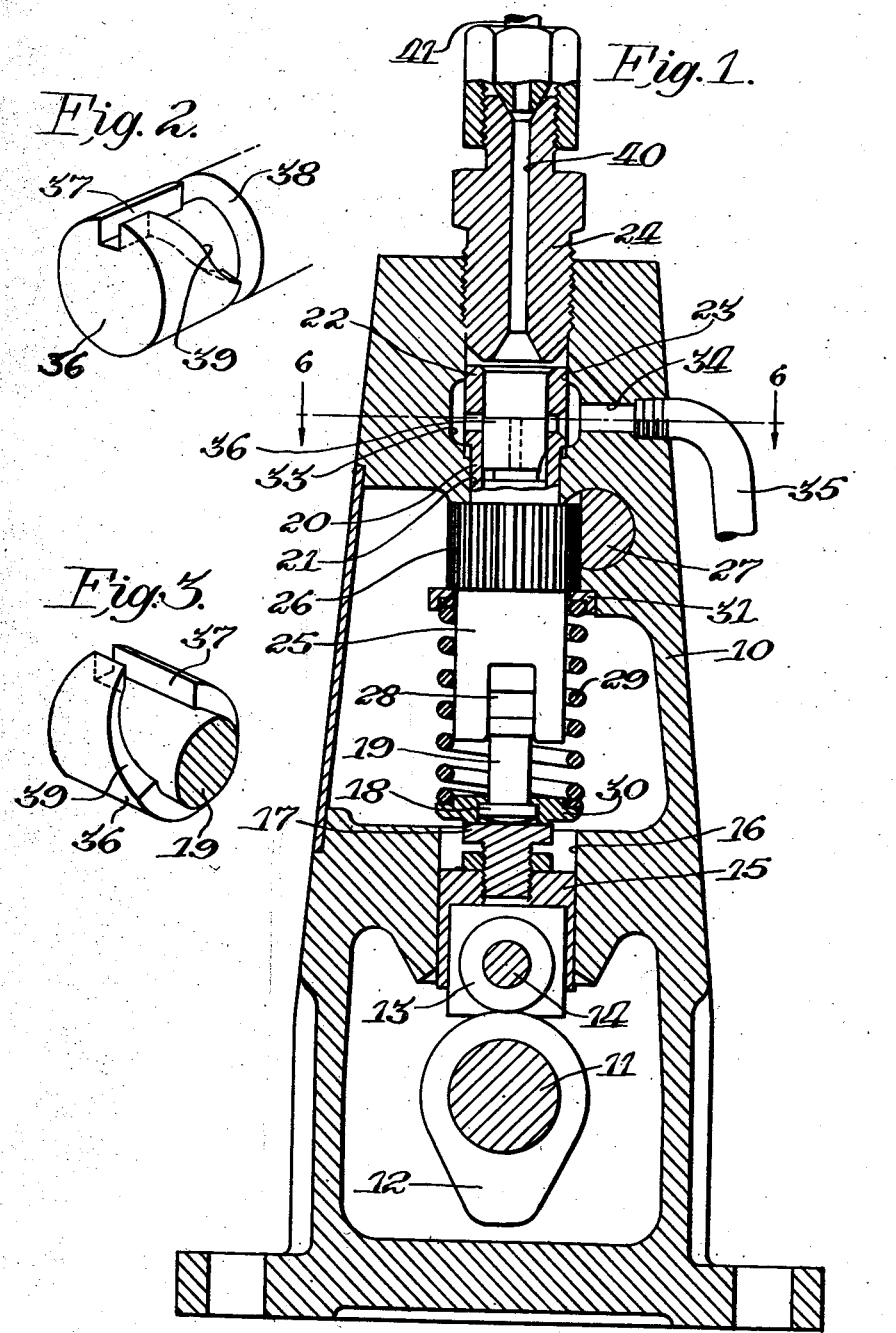

Inventor
Edward A. Johnston
By Paul O. Pippel
Atty.

Feb. 10, 1942.    E. A. JOHNSTON    2,272,300
FUEL PUMP
Filed March 6, 1939    3 Sheets-Sheet 3

Inventor
Edward A. Johnston
By Paul O. Pippel
Atty.

Patented Feb. 10, 1942

2,272,300

UNITED STATES PATENT OFFICE 2,272,300

FUEL PUMP

Edward A. Johnston, Chicago, Ill., assignor to International Harvester Company, a corporation of New Jersey Application March 6, 1939, Serial No. 259,993

8 Claims. (Cl. 123—139)

This invention relates to a fuel injection system for internal combustion engines. More specifically, it relates to a fuel metering and injection device particularly designed for Diesel engines.

For supplying fuel to solid injection engines— that is, engines in which the fuel is injected as a liquid without the use of air—metering is a serious problem, particularly in smaller engines where the charges for part load are very small. In most fuel injection systems now in use, the fuel is metered on the high pressure side of the injection system. As leakage occurs to a greater extent when the fuel is under high pressure, a very small percentage of fuel loss materially affects the injected charge for small bore engines operating at part load. Various means have been devised for metering the fuel at a lower pressure and for regulating the injection system to compensate for fuel leakage and for other inaccuracies at high speeds and at the high pressures necessary for injection. It is to a device of this type that the present invention relates.

The principal object of the invention is to provide a fuel injection system with means for metering the fuel at a pressure substantially below the injection pressure. Another object is to provide means for hydraulically injecting a fuel charge by means of a differential piston arrangement whereby the amount of the operating fluid on the injection device determines the amount of injected fuel.

A more specific object is to provide a metering pressure supplying piston in combination with a differential injection plunger, utilizing the fuel as a fluid for the hydraulic injection system in addition to supplying fuel to the injection plunger.

The above objects and others which will be apparent from the detailed description to follow, are accomplished by a device one embodiment of which is shown in the drawings.

The device consists essentially of a variable capacity pump driven in timed relation with the crankshaft of the engine. The capacity of the pump in the particular illustration is approximately four times the amount of fuel to be injected into the engine cylinder. It is to be understood that any ratio between the operating fluid and the injection injected fluid may be used. From the pump the fluid under a pressure approximately one-fourth of that required for injection, is delivered to the nozzle assembly. Said assembly is formed with a differential plunger unit having an end of large area against which the fluid under pressure acts. The plunger unit is also provided with an injection end portion of a cross-sectional area substantially one-fourth of that of the large end. A chamber for injected fuel is formed in which the small end portion of the injection plunger operates. Fuel from the main supply line leading from the pump is supplied to the injection chamber, filling the chamber and the conduit leading therefrom to the injection valve. The construction is such that communication is cut off to the injection chamber upon the initial movement of the injection plunger unit. A pressure is then applied on the fuel in the injection chamber substantially four times the pressure obtained by the pump. This pressure is sufficient to open the injection valve and to supply fuel to the combustion chamber at the desired high pressure. By means of a fuel injection system of this type, the fuel is metered at a substantially lower pressure and in a substantially higher volume than the injected fuel. With such a construction, more accurate metering can be accomplished and wear of the parts is not as significant.

In the drawings,

Figure 1 is a vertical cross section through a pump adapted to the injection system of the invention;

Figure 2 is a perspective view of the top end of the metering and pressure-supplying piston of the pump;

Figure 3 is another perspective view of the top end of the same piston;

Figure 4:
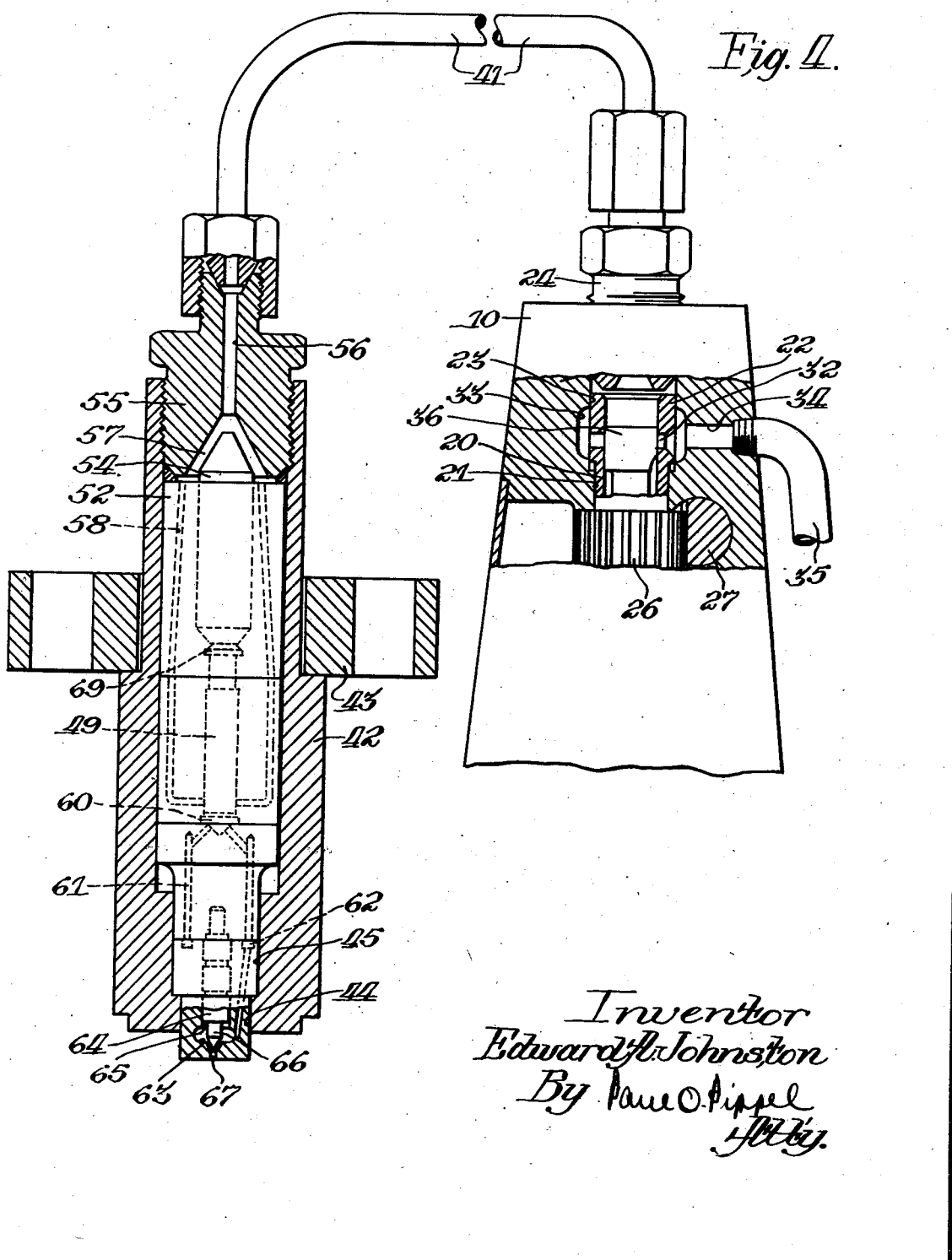
Figure 4 shows the upper portion of the pump structure shown in Figure 1 and a vertical cross section of an injection unit, certain portions of the unit being shown in elevation.

Referring to Figure 1, a pump casing 10 is shown in which a driving shaft 11 is mounted for rotation. A cam 12 on the shaft 11 is adapted to engage a roller 13 mounted on a shaft 14 supported in a reciprocating guide member 15 mounted for vertical movement in a bore 16 formed in the lower part of the casing 10. An adjustable tappet 17 is threaded into the member 15. Said tappet engages a head 18 formed on the bottom of a pump piston 19. Said piston is mounted for reciprocation in a sleeve 20 fitted in a bore 21 formed in the upper portion of the casing 10. The sleeve 20 is formed with an enlarged upper end 22 fitting in an enlarged bore 23 coaxially with the bore 21. A fitting 24 threaded into the upper end of the bore 23 holds the sleeve in position in the casing.

A cylindrical adjusting member 24 is rotatably mounted on the lower end of the sleeve 20. Said member includes a gear 26 at the upper end which engages a rack member 27 slidably mounted in the casing 10. By reciprocation of said rack the member 25 may be rotated. A means including a cross member 28 carried by the member 25 provides a connection with the piston 19 by means of which it may be rotated in the sleeve or cylinder 20 to adjust the angular position of the top end of the piston. This adjusting construction is well known in the art and has not been shown in detail. A compression spring 29 abuts a retainer 30 supported on the head 18 of the piston 19 and a retainer 31 abutting the gear 26. Said spring returns the piston from its injecting position and maintains the roller 13 on the cam 12.

Figure 6:
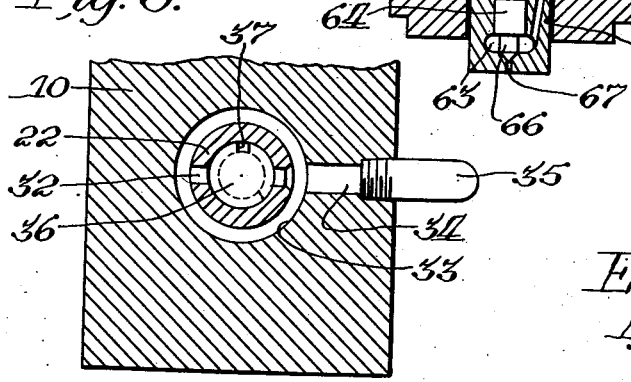
Figure 6 is a cross section taken on the line 6—6 of Figure 1.

As best shown in Figure 6, the enlarged end 22 of the cylinder 20 is provided with diametrically positioned openings 32. Said openings form means for communicating with an annular channel 33 formed in the casing 10 around the cylinder. A conduit 34 communicates with the channel 33 and with a fuel supply line 35. In the operation of the pump, fuel is supplied to the line 35 under a constant low pressure in order to facilitate metering of the fuel.

As best shown in Figures 2 and 3, the upper end 36 of the piston 19 is provided with an axial slot 37 and an annular channel 38 spaced from the top of the piston with which the slot 37 communicates. A spiral cut-off portion 39 leads downwardly from the upper portion of the slot 37 to the annular channel 38. It will be understood that with the pump piston 19 in the position shown in Figure 1, the entire system of the pump and nozzle assembly will be filled with liquid fuel supplied through the line 35 and the conduit 34. As the cam 12 rotates, the piston is raised to the position shown in Figure 4. As soon as the top of the piston passes the upper edges of the openings 32, pressure is built up. This pressure is communicated through a conduit 40 in the fitting 24 to a conduit 41 leading to the injection unit. Pressure continues to be applied until the spiral cut-off 39 reaches the lower edge of one of the openings 32, at which point fuel is by-passed through the slot 37 and the channel 38 back to the supply conduit 34.

The type metering pump as shown and above described is well known and is now in wide use for direct injection. Applicant, however, makes use of this pump in a hydraulic system with a differential piston action whereby a multiple of the quantity of the injected fuel may be metered and operated on by the pump at a corresponding fractional pressure.

The injection unit consists of a casing 42 provided with a shoulder against which a clamping member 43 is fitted for mounting the injection unit in the head of an internal combustion engine. The casing 42 is formed with a bore 44 at the lower end and an enlarged bore 45 directly above the bore 44. An injection nozzle casing 46 is fitted in the bore 45 with a reduced end portion extending through the bore 44. A bore 47, somewhat larger than the bore 45, extends to the top of the casing 42. A conduit member 48 is fitted in the lower end of said bore, being provided with a reduced end portion fitting in the bore 45 and abutting the injection nozzle casing 46. A combined conduit cylindrical member 49 is fitted in the bore 47 abutting the top of the member 48. Said member is provided with a central bore 50 which forms a cylinder for an injection plunger 51. A conduit and cylinder member 52 is fitted in the bore 47 abutting the upper end of the member 49. Said member is formed with a central bore 53 which forms a cylinder for a pressure-supplying plunger 54, and fitting 55 is threaded into the upper end of the casing 42 holding all of the members mounted therein rigidly in position. Said fitting is provided with a conduit 56 connected to the high pressure supply conduit 41 previously referred to.

The upper end of the pressure-supplying plunger 54 is conical in shape, being fitted into a conical chamber 57 formed in the lower end of the fitting 56. Conduits 58 formed in the member 52 communicate with the chamber 57 and with conduits 59 formed in the member 49. The conduits 59 communicate with the bore 50 and adjacent its lower end with a chamber 60 which may be properly designated as the injecting chamber. Said chamber communicates, by means of a conduit 61 formed in the member 48, with a conduit 62 formed in the nozzle casing 46. The conduit 62 communicates with a nozzle chamber 63 formed at the lower end of the casing 46. An injection valve 64, slidably mounted in a bore 65 formed in the casing 46, carries a needle 66 which controls the outlet passage 67 from the nozzle casing. A compression spring 68, mounted in a bore formed in the member 48, maintains the injection valve 64 seated to seal the discharge passage 67 until the pressure in the system reaches the desired minimum to provide effective injection into an engine cylinder under operating pressure.

Figure 5:
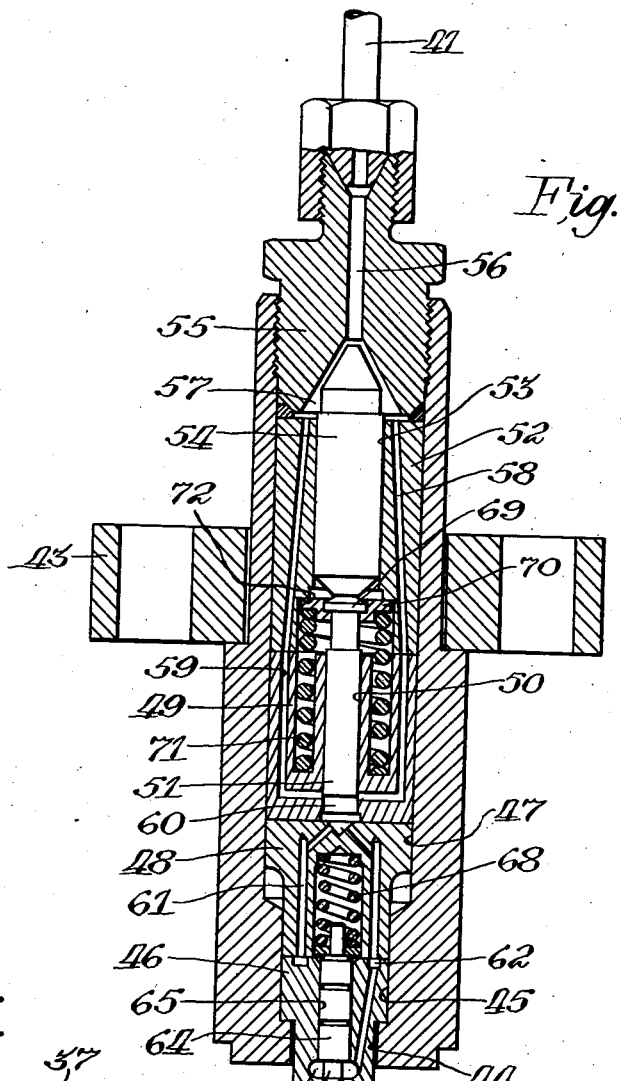
Figure 5 shows a vertical cross section through the axis of the injection unit of Figure 4.

The injecting plunger 51 is provided with a head 69 at its upper end, against which a retainer 70 is fitted. A compression spring 71 seated in an annular recess formed in the member 49 abuts the retainer 70 to urge the injecting plunger 51 in an upward direction. It will be noted that the retainer 70, as shown in Figure 1, abuts a shoulder 72 when the injecting plunger is in its lifted or non-operative position. Referring to Figure 5, when the injecting plunger 51 is lifted, communication is formed between the conduits 59 and the chamber 60 whereby said chamber will be filled with fuel.

The head 69 of the injecting plunger 51 abuts the lower end of the pressure-supplying plunger 54; said plunger, as illustrated, has substantially four times the cross-sectional area of the plunger 51. Pressure supplied in the chamber 57 is effective to act over the total cross-sectional area of the plunger 54 regardless of the shape of its upper end.

Several of the important features of operation of the injecting system comprising this invention have been explained in connection with the description of the parts and their relative arrangement. The pump delivers metered amounts of fuel under pressure through the conduit 41 to the injection unit. During initial operation the plunger 54 is driven downwardly as the injection valve 64 is set to operate at a much higher pressure than the pressure initially supplied by the pump. As the plunger 54 moves downwardly it also carries the injection plunger 51 downwardly the lower end of which acts as a piston valve closing the ends of the conduits 59, thereby cutting off communication between the injection chamber 60 and said conduits. A pressure is thereafter built up in the injection chamber 60 to a degree represented by the ratio between the cross-sectional area of the injecting plunger 51 and the pressure-supplying plunger 54. The pressure attained is, therefore, sufficient to unseat the injection valve 64 and to begin injection of fuel into the combustion chamber of the engine. This injection continues until the end of the effective stroke of the pump piston 19. This effective stroke is determined by the angular position of the piston as determined by the position of the adjustment provided therefor. Figure 4 shows an injecting position of the plunger 51 and the injection valve 64.

As soon as the pump piston 19 has passed the cut-off position, pressure in the line 41 is relieved, the spring 71 returns the plungers 51 and 54 to their initial positions, and the injection valve 64 is seated.

In effect, a hydraulically operated injection device has been provided by means of which the fluid for operating the hydraulic device is metered rather than directly metering the injected fuel. The advantage gained is that the fuel may be metered in much larger volumes and at much lower pressures. This is a particularly significant factor when using fuel injection devices for small bore engines and at part load when the injected charges are very small.

It will be understood that applicant has shown and described only a preferred embodiment of his improved fuel injection system, and that he claims as his invention all modifications falling within the scope of the appended claims.

What is claimed is:

1. A fuel injection system comprising a metering pump, a fuel injection unit, means for conducting fuel from said pump to said unit, a differential injection plunger assembly having a low pressure end of one diameter and a high pressure end of smaller diameter mounted for reciprocation in said unit, conduit means for initially conducting fuel to both ends of said plunger assembly, valve means to cut off the communication of the conduit means for conducting fuel to the high pressure end after a predetermined small distance of travel of the plunger assembly, an injection nozzle, and means for conducting fuel from said high pressure end of the plunger assembly to said nozzle.

2. A fuel injection system comprising a fuel metering pump of a capacity to supply a quantity substantially greater than the quantity to be injected at a pressure lower than the injection pressure, a fuel injection unit, means for conducting fuel from said pump to said unit, a differential injection plunger assembly having a low pressure end of one diameter and a high pressure end of smaller diameter mounted for reciprocation in said unit for injecting a predetermined small portion of the metered fuel at a substantially higher pressure than the pump pressure, conduit means for initially conducting fuel to both ends of said plunger assembly, valve means to cut off the communication of the means for conducting fuel to the injection end after a predetermined small distance of travel of the plunger assembly, an injection nozzle and means for conducting fuel from the high pressure end of the plunger assembly to said nozzle.

3. A fuel injection system for engines comprising a metering pump, means to supply fuel to said pump, a fuel injection nozzle assembly, an injection plunger unit mounted for reciprocation in said assembly, said unit having an injecting end portion of one diameter and a pressure-supplying end portion of a substantially larger diameter, conduit means for initially conducting fuel from the metering pump to both end portions of said unit, valve means to cut off the supply of fuel to the injecting end portion after a predetermined small distance of travel of the plunger unit, an injection nozzle, and means for conducting fuel from the injecting end portion of the plunger unit to said nozzle.

4. A fuel injection system for engines comprising a metering and pressure-supplying pump, means to supply fuel to said pump, a fuel injection nozzle assembly, means for conducting fuel from the metering pump to said nozzle assembly, an injection unit mounted in said assembly, said unit including an injection plunger of one diameter and a pressure-supplying plunger of a substantially larger diameter whereby a differential pressure action is attained, conduit means for supplying fuel from the conducting means to both of said plungers, valve means to cut off the fuel supply to the injection plunger after a predetermined small distance of travel of the plungers, an injection valve, and conduit means effective to deliver fuel from the high pressure injection plunger to said valve.

5. A fuel injection system for engines comprising a metering and pressure-supplying pump of a capacity to supply a metered quantity of fuel substantially greater than the quantity to be injected at a pressure substantially lower than the required injection pressure, means to supply fuel to said pump, a fuel injection nozzle assembly, means for conducting fuel from the metering pump to said nozzle assembly, an injection unit mounted in said assembly, said unit including a cylinder having end portions of two different diameters, an injection plunger of one diameter in one end of the cylinder and a pressure-supplying plunger of a substantially larger diameter in the other end of the cylinder whereby a differential pressure action and volume displacement is effected, conduit means for supplying fuel from the conducting means to the cylinder at both ends, valve means to cut off the conduit means to the injection plunger end of the cylinder after a predetermined small distance of travel of the plungers, an injection nozzle, and conduit means for delivering fuel from the injection plunger end of the cylinder to said nozzle.

6. A fuel injection system for engines comprising a metering and pressure-supplying pump of a capacity to supply a measured quantity of fuel substantially greater than the quantity to be injected at a pressure substantially lower than the required injection pressure, means to supply fuel to said pump, a fuel injection nozzle assembly, an injection unit mounted in said assembly, said unit including a cylinder of two different diameters, said unit including a fuel supply and pressure chamber at the large end of the cylinder, means for supplying fuel from the metering pump to said chamber, an injection plunger of one diameter in one end of the cylinder and a pressure-supplying plunger of a substantially larger diameter in the other and large end of the cylinder whereby a differential pressure action and volume displacement is effected by movement of the plungers toward the smaller end of the cylinder, said unit being formed with an injection chamber at the small end of the cylinder, conduit means for supplying fuel from the supply chamber to the injection chamber, valve means operable by movement of the injection plunger to cut off said conduit means after a predetermined small distance of travel of the plungers, an injection nozzle, and conduit means for delivering fuel from the injecting plunger end of the cylinder to said nozzle.

7. A fuel injection system for engines comprising a metering and pressure-supplying pump of a capacity to supply a measured quantity of fuel substantially greater than the quantity to be injected at a pressure substantially lower than the required injection pressure, means to supply fuel to said pump, means for releasing pressure developed by the pump upon completion of its delivery, a fuel injection nozzle assembly, an injection unit mounted in said assembly, said unit including a cylinder of two different diameters, said unit including a fuel supply and pressure chamber at the large end of the cylinder, means for supplying fuel from the metering pump to said chamber, an injection plunger of one diameter in one end of the cylinder and a pressure-supplying plunger of a substantially larger diameter in the other end of the cylinder adjacent the supply chamber whereby a differential pressure action and volume displacement is effected, said unit being formed with an injection chamber at the small end of the cylinder, conduit means for supplying fuel from the supply chamber to the injection chamber, valve means operable with the injection plunger to cut off said conduit means after a predetermined small distance of travel of the injecting plunger, an injection nozzle, conduit means for delivering fuel from the injecting plunger end of the cylinder to said nozzle, and spring means to return the plungers upon the release of pressure in the pump.

8. A fuel injection system for engines comprising a metering and pressure-supplying pump, a fuel injection nozzle assembly, an injection unit mounted in said assembly, said unit including a cylinder and an injection plunger of one diameter and a pressure-supplying cylinder and plunger of a substantially larger diameter whereby a differential pressure action is attained, conduit means for initially conducting fuel from the pump to both of said cylinders, an injection nozzle, valve means operable with the injection plunger to cut off the supply of fuel to the injection cylinder after a predetermined small distance of travel of said plunger, and conduit means to deliver fuel from the high pressure plunger to said nozzle.

EDWARD A. JOHNSTON.